United States Patent Office.

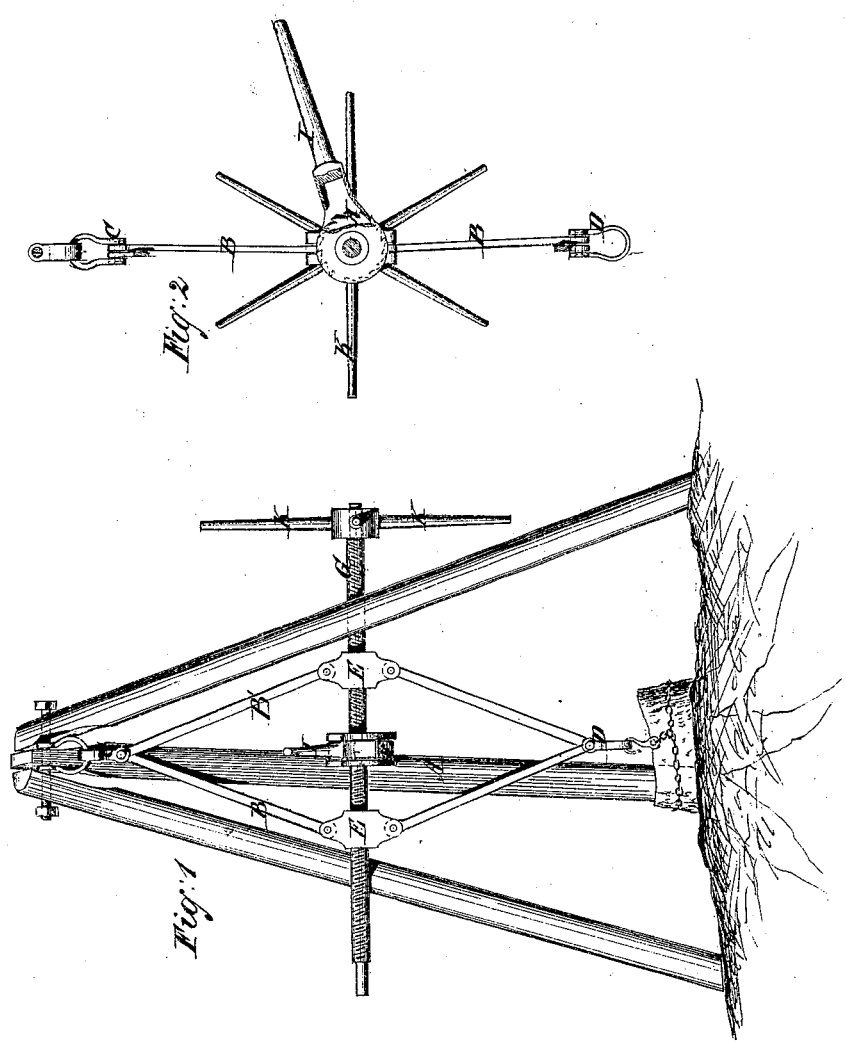

JAMES M. EASON, OF CHARLESTON, SOUTH CAROLINA.

Letters Patent No. 102,516, dated May 3, 1870.

IMPROVEMENT IN STUMP-EXTRACTORS.

The Schedule referred to in these Letters Patent and making part of the same.

*To all whom it may concern:*

Be it known that I, JAMES M. EASON, of Charleston, in the district of Charleston and State of South Carolina, have invented a new and improved Stump-Puller; and I do hereby declare that the following is a full, clear, and exact description thereof, which will enable others skilled in the art to make and use the same, reference being had to the accompanying drawings forming part of this specification.

This invention relates to improvements in machinery for pulling stumps, and consists in suspending the chain-hook from any suitable portable frame, by two pairs of arms, toggle-jointed to nuts, on a right-and-left-threaded horizontal screw, which is provided with a hand-lever, ratchet, and pawl, at the center, for applying the power for raising the stumps by screwing the nuts away from each other, and with short levers at one end for turning it rapidly to force the nuts together, to let the weight or chain-hook down, all as hereinafter more fully specified.

Figure 1 is a side elevation of my improved machine, and

Figure 2 is an elevation of the toggle-arms and screw, and hand-levers, taken at right angles to the plane of fig. 1.

Similar letters of reference indicate corresponding parts.

A is the frame, which may be constructed in any preferred way.

B B' are the two pairs of arms suspended on a pivot, C, common to both, at the top, and connected to the ring or hook D for connecting the chain.

Each pair is jointed to the nuts E, one having a right-hand, and the other a left-hand thread, and both placed on the right-and-left-threaded screw G, whereon, at the center, is a ratchet-wheel, H, and pawl-lever, I, by which the power is to be applied for forcing the nuts apart, and thereby raising the ring or hook D.

This screw also has short hand-levers, K, at one end, for turning it rapidly to move the nuts together and let the ring or hook down.

This arrangement is very simple, cheap, light, and powerful, and affords an economical and useful stump-puller.

Having thus described my invention,

I claim as new and desire to secure by Letters Patent—

The combination with the two pairs of arms B B' suspended from the frame, connected to the hook or ring D, and to the right-and-left-threaded nuts E, as described, of the right-and-left-threaded screw, ratchet, ratchet-lever, and the hand-levers K, all substantially as specified.

J. M. EASON.

Witnesses:
 JNO. G. THURSTON,
 D. H. JACQUES.